Feb. 4, 1964 C. L. PETERSON 3,120,492

FILTER MEDIUM TRACKING CONTROL

Filed Nov. 25, 1960 3 Sheets-Sheet 1

INVENTOR.
C. Lynn Peterson
BY
ATTORNEYS

Feb. 4, 1964

C. L. PETERSON 3,120,492

FILTER MEDIUM TRACKING CONTROL

Filed Nov. 25, 1960

INVENTOR.
C. Lynn Peterson
BY
McGrew and Edwards
ATTORNEYS

Feb. 4, 1964 C. L. PETERSON 3,120,492

FILTER MEDIUM TRACKING CONTROL

Filed Nov. 25, 1960 3 Sheets-Sheet 3

INVENTOR.
C. Lynn Peterson
BY
McGrew & Edwards
ATTORNEYS

United States Patent Office 3,120,492

Patented Feb. 4, 1964

3,120,492
FILTER MEDIUM TRACKING CONTROL

C. Lynn Peterson, Salt Lake City, Utah, assignor to Peterson Filters & Engineering Company, Salt Lake City, Utah, a corporation of Utah Filed Nov. 25, 1960, Ser. No. 71,464
7 Claims. (Cl. 210—401)

This invention relates to improvements in continuous rotary filtering apparatus having a cake discharge section spaced from the filtering section and utilizing an endless filter medium of a length in excess of the filtering section, such as exemplified by the rotary drum filtering apparatus of the Wilson U.S. Patent No. 2,812,065 and Siebenthal U.S. Patent No. 2,812,064.

Rotary drum filters, particularly of the vacuum type, exemplified by the above entitled patents normally greatly improve the overall operational efficiency of such filters, including start-up and maintenance. In using such rotary filters with the endless filter medium, however, substantial difficulty has been encountered in maintaining the endless filter medium centered correctly on the apparatus so as to seal the perforate surface of the drum during its filter cycle and as it passes through the cake discharge section. Also, maintaining a filter medium centered on other types of rotary filters such as band type filters has been a problem, especially devices using chain belts and the like. With drum filters, increasing the filter width accentuates the tracking problem.

Since a rotary vacuum filter utilizes a perforate surface the filter medium must cover this surface during application of suction. For very large drum filters, for example, a 10 foot diameter, 18 foot long drum, no completely satisfactory filter medium tracking and centering system has been found for the various types of filter medium utilized. For example, filter medium may be made of wire cloth, etc., cloths of synthetic fibers such as nylon, polyethylene, etc., and various natural fibers including cotton, wool, etc.

It is, therefore, included among the objects and advantages of the invention to provide a novel filter mechanism and method for maintaining an endless filter medium centered on a rotary filter during operation. The device is arranged to maintain the filter medium automatically centered during such operation. The invention, further, substantially eliminates wrinkling of the filter medium material, provides positive tracking of the filter medium in the filtering section and through a cake discharge section and additionally maintains proper tension on the filter medium to provide desired tautness for operation. The automatic tracking mechanism of the invention specifically provides positive and accurate filter medium tracking for rotary vacuum drum filters.

These and other objects of the invention may be readily ascertained by referring to the following description and appended drawings in which.

Figure 1:
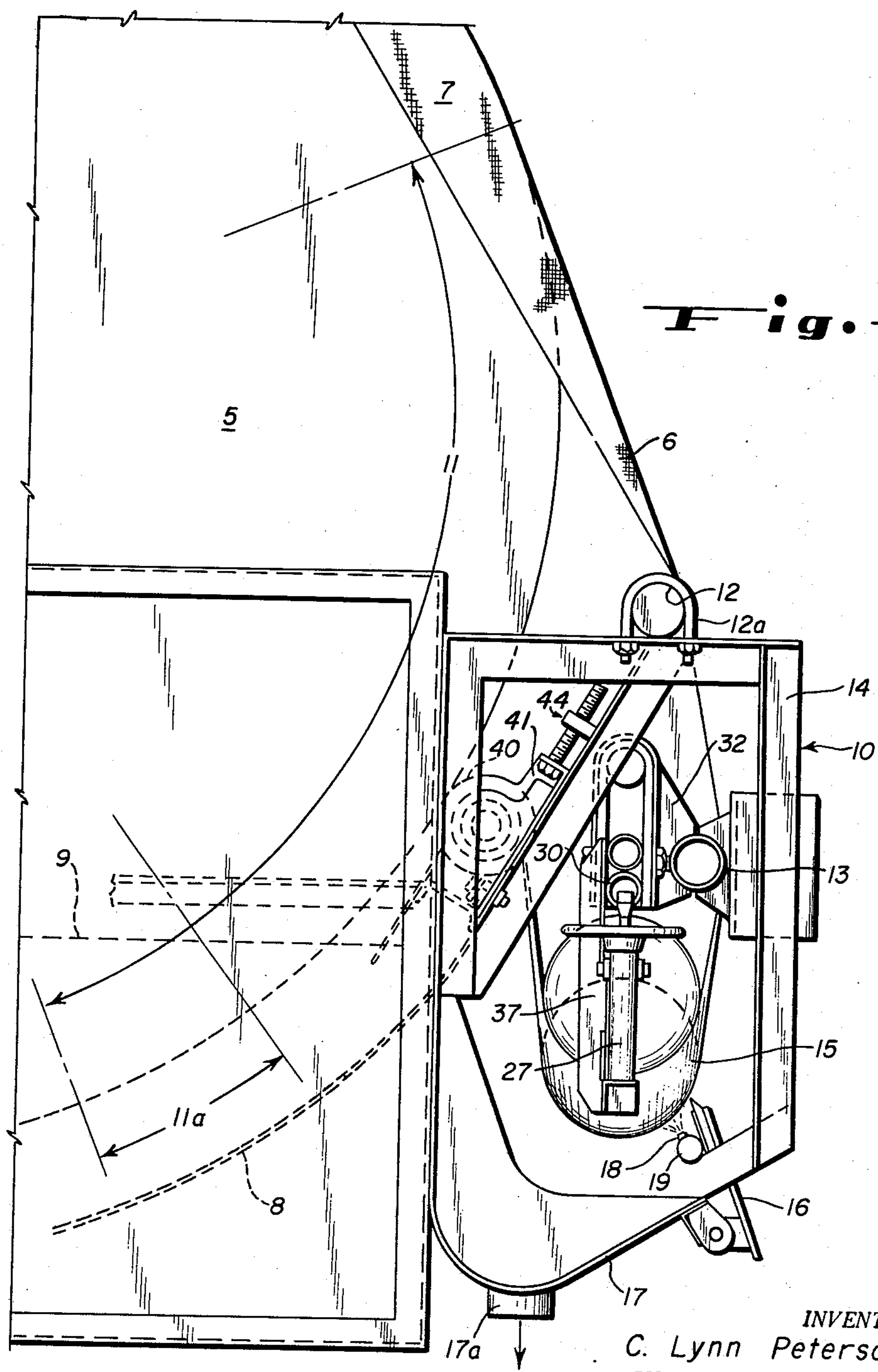
FIG. 1 is a partially schematic, partial section of a filter cake discharge apparatus for a drum filter according to the invention, partially showing a filter drum and its relation to the cake discharge section.
Figure 2:
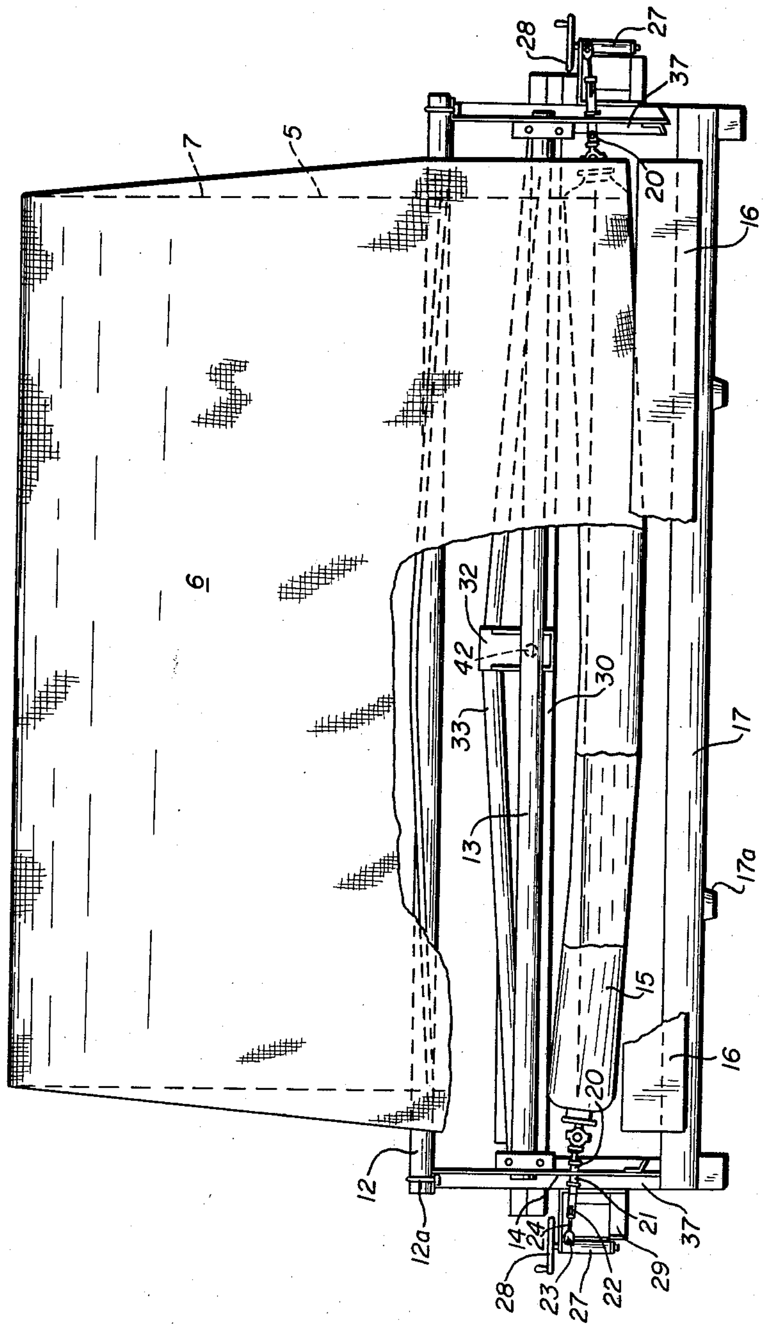
FIG. 2 is a front elevational view of the device of FIG. 1.

In the device illustrated in FIG. 1, a rotary vacuum drum 5, only a portion of which is shown, is arranged with a filter medium 6 looped around it and through a cake discharge section shown in general by numeral 10, described fully below. The filter medium 6 is substantially wider than the drum 5 providing an overlap 7 which literally laps around the ends of the drum 5. The drum is arranged by conventional means for rotation in a slurry tank 8 which is arranged to hold a body of slurry for variable, partial submergence of the drum therein. A level of such slurry is indicated at the dashed line 9; however, this may be adjusted as desired by conventional means. A rotary valve, not shown, is arranged to provide a filtering cycle, as is conventionally used in the art. In one form vacuum is applied to about three-fourths of the drum surface for filtering. In about the quarter circle 11 adjacent the cake discharge, where there is no filter medium covering the drum deck, the suction source is cut off. Suction is started in the small area 11*a* as the drum approaches and enters the slurry. This provides a relatively dry cake on the filter medium as it leaves the drum for passage into the cake discharge section.

The cake discharge section 10 includes a training rod 12 which is mounted on the filter framework by U-bolts 12*a* in position to support the filter medium 6 after it leaves the drum periphery. A cake discharge roller 13 is similarly mounted on a framework 14. This discharge roller may be a stationary shaft or preferably a rotary shaft, the actual journal bearings not being shown since such mechanisms are well known. The cake discharge roller 13 may be merely a relatively small diameter shaft over which the filter medium with its carried cake passes, and on such passage, the cake breaks and falls off. The discharged cake is deflected into a receptacle (not shown) by means of a deflector plate 16, which is spaced away from the filter medium to avoid contact but close enough to scrape off clinging cake portions. The discharge roller may, also, be a hollow shaft through which a discharge fluid is forced at high pressure through the filter medium to thereby cause discharge of the cake. Such devices are known, as exemplified in the above named patents, and detailed structure is not necessary herein. The filter medium is looped around a fluid tension roller 15, subsequently over an adjustable return roller 40, and from there it passes back onto the drum 5. The discharge section is mounted above a trough 17 for the collection of fluid used to clean the filter medium, for example, water under pressure issuing from spray heads 18 mounted on a feed manifold 19.

The fluid tension roller 15 is a resilient, flexible tubular member partially filled with fluid, preferably water, and sealable so as to maintain a predetermined level of water therein. The ends of the flexible member are closed and a stub shaft 20 is attached thereto. The support for each end of the roller is the same, and a single end will be described. The shaft 20 is mounted in an anti-friction swivel or journal 21 which permits free rotation of the shaft 20. The journal 21 is mounted on a support link 22 which is mounted in a jack screw runner 23 which permits limited vertical, pivotal movement of the support 22. The support 22 is threadedly secured to a bolt 24 for adjustable connection to the jack screw runner 23 for providing adjustable tension on the fluid roller 15. The jack screw runner 23 is mounted on and threadedly engages a jack screw (not shown) mounted in housing 27. The jack screw is mounted on a bracket 29, which is secured to the end frames 37 of a balance or tracking beam 30. The jack screw is operated by manipulating wheel 28. With this arrangement the amount of curve or amount of sag in the flexible roller 15 may be adjusted depending on the stretch in the filter medium. In some cases a cable may be mounted internally of the roller and secured to the ends, whereby the tube is supported by the cable so that there is minimum lateral tension in the tube walls. Thus, the cable prevents distortion of the tube if no internal support were provided. It is desired to maintain as true a cylinder as possible, with a smooth convex curve.

The balance beam 30 is pivoted on a pivot pin 42 mounted on a mount 32 secured to discharge roller 13. A strengthening member 33 extends from the mount 32 to the end frames 37 for supporting the balance beam. This system pivotally supports the flexible roller about an upper pivot point. The mechanism is substantially balanced about its pivot in vertical or zero position, including the flexible roller, about the pivot pin 42. For large units a perimeter frame, which includes a lower cross member in addition to the beam and side frames, may be necessary to provide adequate strength.

The jack screw adjustment for the flexible roller 15 provides means for independently raising or lowering either ends of the flexible roller so as to adjust its position within the framework, to thereby provide the desired curve of the tube as determined by the filter medium in which it is mounted.

With the flexible tension roller 15 being in effect pivotally suspended from a single point, it is free to tilt within a limited distance in either direction. When the filter medium moves laterally across the fluid tension roller, the roller tilts, causing the contained fluid to move toward the low end of the tilt, inducing an unequal weight on the filter medium raising the other side. The filter medium moves away from the increased weight or tension toward the center, automatically centering the filter medium.

Figure 3:
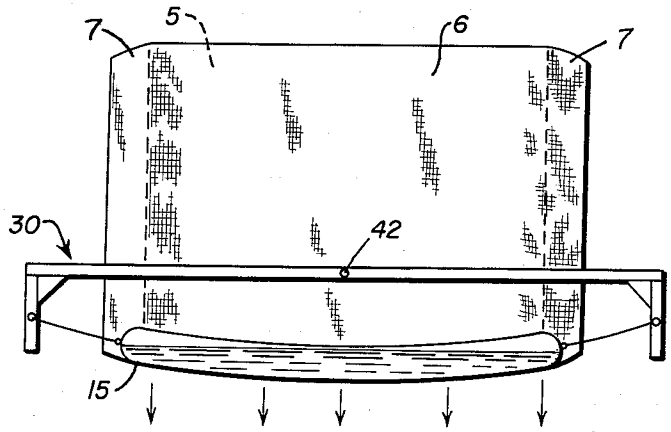
FIG. 3 is a schematic view of the cloth tracking mechanism illustrating an operation of the automatic filter medium tracking means, according to the invention.
Figure 4:
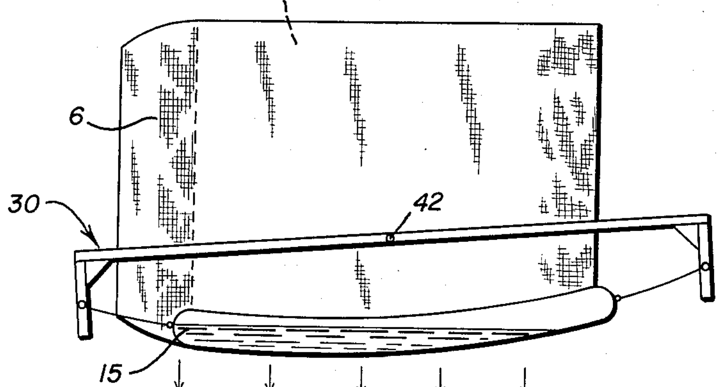
FIG. 4 is another schematic illustration of the operation of the tracking means.

The action of the flexible roller, acting in conjunction with the beam, is illustrated schematically in FIGS. 3 and 4. As shown in FIG. 3, when the filter is operating in a balanced position, the filter medium is centered on the drum with an equal overlap extending beyond each end of the drum. The fluid tension roller 15 bears against the filter medium, pulling it taut, and forming, as shown within the dashed lines, a stretched area of the filter medium within the drum edge width and leaving a relatively unstretched filter medium in the lap beyond the drum edges. In the event that the filter medium creeps to the left as illustrated in FIG. 4, the stretched filter medium immediately adjacent the left end of the drum moves off the drum along with the unstretched lap. As this stretched portion is longer than the unstretched lap, the left end of the fluid tension roller is lowered, and simultaneously the unstretched lap of filter medium of the right hand moves onto the drum. This unstretched lap, being shorter than the filter medium portion moving further toward the center of the drum, raises the right end of the fluid tension roller. This tilting of the fluid tension roller causes the water or contained fluid to flow toward the lowered left end adding weight to this end. The filter medium then moves away from the increased weight or, in other words, it moves away from the increased tension toward the least tension in the filter medium and hence moves back toward the right. The same forces act on the filter medium when the filter medium moves to the right, but obviously the forces act in the opposite direction to force the filter medium back centerwise of the drum. In normal operation, however, the filter medium oscillates slowly back and forth within adjustable limits.

Figure 5:
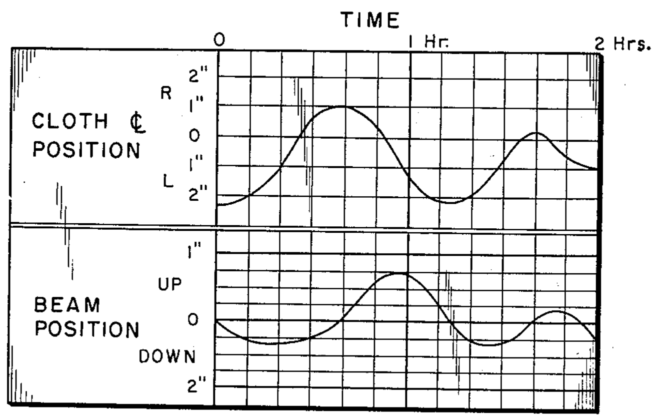
FIG. 5 is a graph illustrating movement of a tracking mechanism in relation to cloth travel laterally of the drum.

The charts of FIG. 5 illustrate an actual test wherein movement of the beam from a centered or zero position is illustrated by the lower chart. This chart shows the end of the beam in inches above or below the zero position. The filter medium measured from a zero position during this same time is shown on the upper chart, where movement of the filter medium edge is measured in inches either right or left of the zero line. At the start of the test, the filter medium was slightly over two inches toward the left from the center or zero line and the beam was in zero position. "L" on the chart indicates left and "R" indicates right of the zero line on the cloth position chart. At the end of ten minutes, the beam had tilted approximately a quarter of an inch down at the left side, and at the same time the filter medium, under influence of the shifting fluid, had moved back toward the right to the two inch position. At about 25 minutes, the filter medium had returned to essentially its center position, and at the same time the beam had started tilting in the opposite direction and was only about one-quarter of an inch tilted downwardly at its left end. Continued operation of the filter resulted in movement of the filter medium to the right about an inch beyond its center line at about 40 minutes. At this same time the beam had tilted back through centered position and was starting to tilt further toward the right. At the end of an hour the beam had tilted almost three-quarters of an inch toward the right, i.e., left end up, shifting the weight of the fluid to the right hand side of hte filter medium so that it had started back toward the center in opposition to the increased tension on the right side. At about the time that the beam had reached its maximum tilt toward the right, the filter medium was recentered and was continuing back toward the left. The beam then slowly tilted back toward the left and by the shift of fluid weight again caused the filter medium to move back to the right. Thus, it is shown that the filter medium runs slightly ahead of the movement of the beam, which is to be expected, since the beam controls the movement of the filter medium.

It is apparent that a filter medium may be tracked on a drum when it is lapped over the ends of the drum and the filter medium is provided with a loop prior to its return to the drum. This system provides a very simple expedient which automatically controls the lateral movement of the filter medium during rotation of the drum.

The tilting flexible roller controls the movement of the filter medium without sensing instruments following the movement of the filter medium edges or without gripping mechanism on the medium edge, and provides an inherent stability for centering the filter medium on a roller, or a rotary drum. Any movement of the filter medium is continuously corrected by the shift in tension of the filter medium by the shift of the contained fluid.

After leaving the fluid tension roller 15 the filter medium may be cleaned by subjecting it to a cleaning fluid issuing from a series of spray heads 18 mounted on the manifold or header 19. The cleaning fluid drops into trough 17 and is released therefrom by outlets 17*a*.

The filter medium is passed over a rotary return roller 40 mounted in an adjustable journal assembly 41 immediately prior to its return to the drum 5. This roller has its ends journalled in a bearing set 41 mounted on biased frame member 43, each of which is adjustable by means of jack screws 44. The roller is movable along the biased frame member to provide a height adjustment for the return roller as well as a control for the tilt of the return roller. In this manner, by adjusting the height of the roller for each filter medium, and by tilting the roller to conform to the stretch, cut, etc. of the individual filter medium, the medium may be initially centered on the filter. This adjustment acts on the filter medium looped around the fluid tension roller and provides a positive action in initially centering the roller so that the mechanism and the filter medium are initially centered. The adjustment of the return roller, also, provides means for adjusting the length of the loop around the fluid tension roller.

While the invention has been illustrated by reference to specific embodiments, there is no intent to limit the spirit and scope of the invention to the precise details so set forth except insofar as defined in the following claims.

I claim:

1. In a filtering apparatus including a rotary drum and a cake discharge section spaced from the periphery of the drum and an endless filter medium wider than the filtering surface of the drum looped over the filter drum and through the cake discharge section, the improvement which comprises a fluid tension roller inclusive of a flexible resilient tubular member partially filled with a liquid and freely rotatably mounted so as to hang in a curve in position bearing against a suspended loop of the filter medium in the cake discharge section, said fluid tension roller being pivotally mounted for free but limited movement about a balanced, substantially central point and arranged to permit said fluid tension roller limited pivotal movement in said discharge section.

2. A device according to claim 1 in which said flexible resilient tube is mounted in a frame, and the frame is pivotally supported to permit free pivotal movement of said resilient tube.

3. In an apparatus which includes a rotary drum and an endless web of a filter-medium-type material looped over the drum and provided with a free-hanging loop prior to return to the drum and in which the material is wider than the drum so as to lap over each end thereof, the improvement which comprises a fluid tension roller inclusive of a flexible, resilient, cylindrical tubular member partially filled with a liquid, and freely rotatably mounted from its ends so as to hang in a curve in the free-hanging loop and so as to retain its essentially cylindrical shape, means supporting said flexible tube resting against the filter medium for rotation by movement of the filter medium, said means supporting said fluid tension roller being pivotally mounted about a balanced, substantially central point and arranged to permit pivotal movement of said fluid tension roller in the loop of the filter medium in said discharge section.

4. A device according to claim 3 in which the tubular member is adjustably mounted within said means supporting said member inclusive of means for independently raising the ends of said tubular member.

5. In a filtering apparatus including a rotary drum and a cake discharge section spaced from the periphery of the drum and an endless filter medium looped over the filter drum and through the cake discharge section with a free-hanging loop, the filter medium being wider than the drum filtering surface, the improvement which comprises a frame inclusive of a beam mounted adjacent said cake discharge section and in said free-hanging loop, a fluid tension roller inclusive of a flexible resilient tubular member freely rotatably supported in said frame and below said beam in position to essentially rest in a curve in the free-hanging loop in the filter medium in the cake discharge section, means pivotally supporting said beam about a balanced, substantially central point so as to permit limited pivotal movement of said fluid tension roller in the loop of the filter medium, and a fluid partially filling said tube so that it hangs in a curve and retains its essential cylindrical shape.

6. A device according to claim 5 in which the flexible tube is supported on a jack screw secured to each side of the frame for selectively raising and lowering the ends of said tube independently of the pivotal action of the frame.

7. In a rotary drum filter of the class described having a cake discharge section spaced from the drum periphery, the improvement which comprises a flexible, hollow tubular member partially filled with liquid and journalled for free rotation at its ends and arranged to be suspended and essentially resting in an arcuate configuration in a suspended loop of the filter medium in said discharge section, means inclusive of a beam interconnected with the journalled ends of said flexible roller for mounting said roller in a suspended loop of said filter medium, and means for pivotally mounting said beam at a central position and arranged to permit free but limited pivotal movement of said beam about said pivotal support.

References Cited in the file of this patent

UNITED STATES PATENTS 2,812,064 Siebenthal -------------- Nov. 5, 1957

FOREIGN PATENTS 207,240 Australia -------------- Mar. 25, 1957
210,825 Australia -------------- Oct. 11, 1957